United States Patent
Harvey et al.

(10) Patent No.: US 7,406,035 B2
(45) Date of Patent: Jul. 29, 2008

(54) METHOD AND APPARATUS FOR PROVIDING REDUNDANT PROTOCOL PROCESSES IN A NETWORK ELEMENT

(75) Inventors: Kendall William Harvey, Woodlawn (CA); Ashley Lawton, Stittsville (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 747 days.

(21) Appl. No.: 10/350,864

(22) Filed: Jan. 24, 2003

(65) Prior Publication Data
US 2003/0140155 A1 Jul. 24, 2003

Related U.S. Application Data

(60) Provisional application No. 60/352,065, filed on Jan. 24, 2002.

(51) Int. Cl.
*G06F 11/00* (2006.01)
*H04L 12/28* (2006.01)
*G06F 15/16* (2006.01)
*G06F 15/173* (2006.01)

(52) U.S. Cl. .................. 370/218; 709/230; 709/223; 370/392; 714/4

(58) Field of Classification Search .......... None
See application file for complete search history.

(56) References Cited

U.S. PATENT DOCUMENTS

| 5,835,696 | A | 11/1998 | Hess |
| 6,049,524 | A | 4/2000 | Fukushima et al. |
| 6,490,246 | B2 | 12/2002 | Fukushima et al. |
| 6,505,311 | B1 | 1/2003 | Ichinohe et al. |
| 6,760,777 | B1 | 7/2004 | Agarwal et al. |
| 6,853,617 | B2 * | 2/2005 | Watson et al. ........... 370/218 |
| 6,910,148 | B1 | 6/2005 | Ho et al. |
| 7,028,224 | B2 | 4/2006 | Mitchell |
| 7,093,160 | B2 * | 8/2006 | Lau et al. .................. 714/11 |
| 2003/0140166 | A1 | 7/2003 | Harvey et al. |
| 2003/0140167 | A1 | 7/2003 | Harvey et al. |

(Continued)

FOREIGN PATENT DOCUMENTS

EP          1 065 844 A2       1/2001

(Continued)

OTHER PUBLICATIONS

IP Infusion: "A Redundant Architecture for Routing Protocols"; White Paper; Online; Jun. 2002; San Jose, CA 95111 <URL:www.ipinfusion.com/pdf/WP_Redundancy_rev0602.pdf>.

*Primary Examiner*—Wen-Tai Lin

(57) ABSTRACT

A method and apparatus for facilitating an activity switch between a plurality of redundant routing modules in a network element is disclosed. Lower layer protocol packets, each encapsulating a higher layer protocol packet, are received at a lower layer task of a first routing module. The method first determines a peer network element In response to failure of a higher layer protocol task of the first routing module. The higher layer and lower layer protocol sessions between a second routing module and the peer network element are terminated following the determination of the peer network element, wherein the second routing module functions as a backup of the first routing module. The method then initiates a switchover from the first routing module to the second routing module of the network element.

25 Claims, 4 Drawing Sheets

U.S. PATENT DOCUMENTS

2004/0260825 A1* 12/2004 Agarwal et al. ............. 709/230
2005/0027859 A1*  2/2005 Alvisi et al. ................. 709/224
2005/0265346 A1* 12/2005 Ho et al. ..................... 370/392

FOREIGN PATENT DOCUMENTS

| | | | |
|---|---|---|---|
| EP | 1 065 844 A3 | 1/2001 | |
| EP | 1 189 384 A | 3/2002 | |
| WO | WO 00/72528 A1 | 11/2000 | |
| WO | WO 01/13555 A1 | 2/2001 | |
| WO | WO 01/41380 A3 | 6/2001 | |
| WO | WO 02/01413 A1 | 1/2002 | |

* cited by examiner

METHOD AND APPARATUS FOR PROVIDING REDUNDANT PROTOCOL PROCESSES IN A NETWORK ELEMENT

RELATED APPLICATIONS

The present application claims priority to Provisional Patent Applications No. 60/352,065, filed on Jan. 24, 2002. The present application is also related to the U.S. patent application Ser. No. 10/350,817, entitled METHOD AND APPARATUS FOR FACILITATING ROUTING PROTOCOL REDUNDANCY IN A NETWORK ELEMENT, and to the U.S. patent application Ser. No. 10/350,818, entitled METHOD AND APPARATUS FOR SYNCHRONIZING REDUNDANT COMMUNICATION TASKS, all filed on the same day as the present application.

FIELD OF THE DISCLOSURE

The present invention relates generally to network communications, and more particularly to synchronization of redundant communication tasks.

BACKGROUND

Data communication protocols serve to facilitate transmission and reception of data across communication networks. For example, transmission control protocol (TCP), Internet protocol (IP), border gateway protocol (BGP), asynchronous transfer mode (ATM), and various other protocols facilitate communication of data between two or more locations in a communication network. Through the use of such protocols, communication of data across a plurality of communication networks may be facilitated, even though two or more of the networks comprise different operating systems and architectures.

The Open Systems Interconnect (OSI) Reference Model developed by the International Standards Organization (ISO) is generally used to describe the structure and function of data communications. The OSI Reference Model encompasses seven layers, often referred to as a stack or protocol stack, which define the functions of data communications protocols. The protocol stack comprises a physical layer, a data link layer, a network layer, a transport layer, a session layer, a presentation layer, and an application layer. A layer does not define a single protocol, but rather a data communications function that may be performed by any number of protocols suitable to the function of that layer. For example, a file transfer protocol and an electronic mail protocol provide user services, and are thus part of the application layer. Every protocol communicates with its peer, which is a standardized implementation of the identical protocol in the equivalent layer on a remote system. For example, a local electronic mail protocol is the peer of a remote electronic mail protocol. As another example, BGP on a local router exchanges routing information with BGP on a neighboring router.

Applications, such as BGP, which require a transport protocol to provide reliable data delivery, often use TCP because TCP verifies that data is delivered across a network (between separate end systems) accurately and in the proper sequence. TCP provides reliability with a mechanism referred to as Positive Acknowledgement with Retransmission (PAR). In simplest terms, a system with PAR re-transmits the data for which it has not received an acknowledgement message from a far-end node. Information is communicated between cooperating TCP modules in segments. A segment is a datagram containing a TCP header and perhaps data. The TCP header contains sequence numbers. Control information, called a handshake, is exchanged between the two endpoints to establish a dialogue before data is transmitted.

As previously discussed, border gateway protocol (BGP) typically runs over TCP (e.g., port 179). BGP version 4 (BGP4) is the current de facto exterior routing protocol for inter-domain (autonomous systems) routing. BGP is a protocol used to advertise routes between networks of routers, e.g., between a Service Provider's network and a Carrier's network. Routers at the edges of these networks exchange BGP messages, which could affect hundreds of thousands of routes. If the BGP process at one of these edge routers terminates (e.g., because of a restart, hardware failure, software upgrade, etc.), service on the routes between the networks is usually affected. The termination also causes additional BGP messages to be exchanged between other edge routers to update information about available routes. Consequently, the termination results in a period of route instability and unavailability of the affected router, which consequences are desirable to avoid. Furthermore, the termination will often result in a flood of re-routing messages being sent into the network, thus adversely affecting performance of the network.

A conventional BGP redundancy technique for addressing BGP process failures involves configuring two or more routers from different vendors in parallel. The objective of such a technique is to reduce the potential for BGP process failures by relying on the assumption that one of the routers will survive at least some of the time a particular set of circumstances that might lead to failure of another router. For example, at least one of the routers would ideally exhibit immunity to failure such as those that might be caused by an offending message, a hardware fault, or a software fault. That is, it is assumed that routers from different vendors are susceptible to different types of failures. This type of conventional BGP redundancy technique is generally expensive due to the inherent cost of the multiple routers and because using equipment from multiple vendors causes additional operation, support, network management, and training costs. Additionally, this type of conventional BGP redundancy technique requires additional BGP messages to be exchanged to move the routes onto the tandem router, thus increasing cost, complexity, and network traffic. The attached routers still notice that the first router has disappeared and then route around it. Accordingly, it is desirable to avoid the disadvantages associated with such a conventional BGP redundancy technique.

A graceful restart mechanism for a router is another conventional technique for addressing BGP process failures. Such a graceful restart mechanism is proposed in an Internet Engineering Task Force (IETF) draft entitled "Graceful Restart Mechanism for BGP". In this proposal, a router has the capability of preserving its forwarding state (routes) over a BGP restart, the ability to notify its peer routers of this capability and the ability to notify its peer routers of an estimated time for restart completion before it initiates such a restart. Upon detecting that the BGP process of the router has terminated (i.e., a failed router) and in response to receiving a corresponding notification, the peer routers do not send new best routes to accommodate for the failed router unless it fails to restart within the specified time limit.

Such a graceful restart mechanism requires that the peer routers be able to interpret and respond to the restart notification. Additionally, while the failed router is restarting it cannot process routing updates that would normally be received. Consequently, it becomes out of date during the period of unavailability, which is followed by a burst of updates once back in service These updates cause increased "churn" in the routing tables of other routers, which affects performance of the network and should therefore be avoided. Even worse, routing loops or "blackholes" may form in this period of unavailability. Such "blackholes" occur when a route is advertised as available, but when the corresponding router is not actually configured to support such a route, resulting in loss of packets intended to be communicated over that route. Furthermore, the router may not actually be coming back into service. Also, since a graceful restart mechanism allows the specified time limit for routers to be restarted, waiting that amount of time can increase the time it takes to detect a failure and route around the failed router. Additionally, implementation of such a grateful restart mechanism requires protocol extensions to BGP to which all routers aware of the failure must adhere in order to support the graceful restart mechanism. Accordingly, it is desirable to avoid the disadvantages associated with a graceful restart mechanism.

Therefore, facilitating synchronization of protocol tasks and related information on redundant routing modules of a network element in a manner that enables limitations associated with conventional redundancy techniques to be overcome is useful.

DETAILED DESCRIPTION OF THE FIGURES

Figure 1:
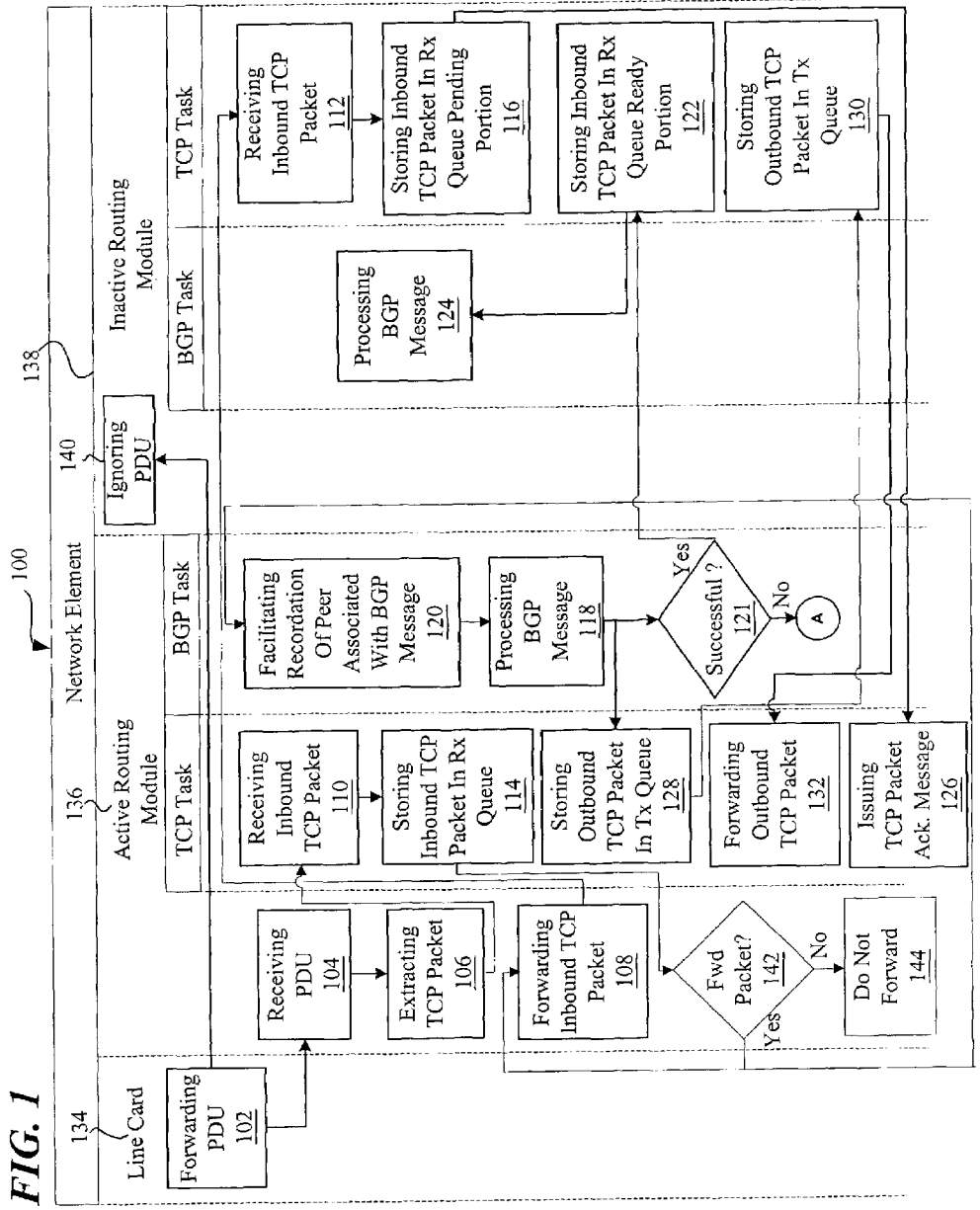
FIG. 1 is flow chart view depicting a method for synchronizing TCP tasks running on redundant routing modules of a network element in accordance with an embodiment of the disclosures made herein.

An embodiment of a method and apparatus for facilitating an activity switch between a plurality of redundant routing modules in a network element is disclosed herein. The method includes an operation for receiving a lower layer protocol packet at a lower layer task of a first routing module. The lower layer protocol packet includes a higher layer protocol packet encapsulated therein. An operation is performed for determining the peer network element from which the higher layer protocol packet was received. The operation for determining a peer network element from which the higher layer protocol packet was received occurs for each received packet. Identification of the peer network element is stored for each received packet. As such, if a failure occurs, the identification of the peer network element can be retrieved and appropriate action taken. In response to determining the occurrence of a failure, an operation is performed for terminating higher layer and lower layer protocol sessions of a second routing module of the network element with the peer network element from which the higher layer protocol packet was received. After terminating such higher layer and such lower layer protocol sessions with the peer network element from which the higher layer protocol packet was received, an operation is performed for implementing an activity switch from the first routing module of the network element to the second routing module of the network element.

The disclosures made herein pertain to various aspects of facilitating synchronization of redundant routing modules in a network element. In accordance with embodiments of the disclosures made herein, lower layer protocol (e.g., Transmission Control Protocol (TCP)) and higher layer protocol (e.g., Border Gateway Protocol (BGP)) tasks of a first routing module are synchronized with respective lower layer protocol (e.g., TCP) and higher layer protocol (e.g., BGP) tasks of a second routing module. The first routing module and the second routing module are redundant routing modules within a network element. Protocol information (e.g., TCP packets, BGP packets, etc) that is processed on the first routing module (e.g., an active one of a plurality of redundant routing modules) is similarly processed on the second routing module (e.g., an inactive one of the plurality of redundant routing modules). Accordingly, such a network element in accordance with an embodiment of the disclosures made herein advantageously comprises redundant, synchronized routing modules that are capable of supporting carrier-grade quality of service over networks of various communication protocols (e.g., Internet Protocol, etc). A lower layer protocol (e.g., TCP) packet (which may be referred to as a segment) is not necessarily congruent with a higher layer protocol (e.g., BGP) packet. For example, it is not necessarily true that a TCP packet contains a BGP packet. For example, say a node is transmitting two BGP packets A and B and each packet includes 1000 bytes. A TCP task will most likely transmit portions of these BGP packets in separate TCP packets. For example, a first TCP segment may contain 512 bytes of data (the first 512 bytes of BGP packet A), a second TCP segment may contain 512 bytes of data (the remaining 488 bytes of BGP packet A, together with the first 24 bytes of BGP packet B), a third TCP segment may contain 512 bytes of data (the next 512 bytes of BGP packet B), and finally a fourth TCP segment may contain 464 bytes of data (the remaining 464 bytes of BGP packet B). The foregoing is merely an example, and other relationships between lower layer protocol packets and higher layer protocol packets are entirely possible.

Embodiments of the disclosures made herein are capable of enabling redundant lower layer protocol tasks (e.g., TCP tasks) and higher layer protocol tasks (e.g., BGP tasks), thus allowing for an activity switch without adversely affecting service. In such embodiments, when an activity switch is implemented, disruption of service on routes distributed by such higher layer and lower layer protocols is limited, if not eliminated. For example, after such an activity switch, a newly active routing module (i.e., previously the inactive routing module) processes routing updates that would normally be received by a newly inactive routing module (i.e., previously the active routing module). Furthermore, the newly active routing module does not become out of date with respect to routing information maintained on other network elements. In this manner, the network is not burdened by a burst of updates in response to the activity switch. Limiting the burden of such a burst of updates eliminates "churn" in the routing tables of network elements, thus improving performance of the network. Significantly, service of existing routes is maintained, and change to existing routes, deletion of routes, and addition of routes can continue uninterrupted; the switchover is transparent to neighboring routers. By being transparent to neighboring routers, a technique disclosed herein need not require cooperation of neighboring routers to enable an activity switch. Accordingly, neighboring routers need not be made aware of such an activity switch, nor do they need to support protocol extensions to enable such an activity switch.

Such embodiments are advantageous in that an offending packet of information that results in failure of a higher layer protocol task of a first routing module does not readily result in failure of the same higher layer protocol task of a second routing module that is redundant and synchronized with respect to the first routing module. One embodiment of a technique for limiting the potential for failure of the second routing module from the offending packet of information is to maintain a higher layer protocol task (e.g., a BGP task) of an inactive one of a plurality of synchronized routing modules (i.e., an inactive routing module) at least one higher layer protocol packet (e.g., a BGP packet) behind the same higher layer protocol task of an active one of the plurality of synchronized routing modules (i.e., the active routing module). In this manner, the offending packet is recognized as such prior to being processed by the higher layer protocol task of the inactive routing module, thereby avoiding the failure of the higher layer protocol task of the inactive routing module that would otherwise result.

Another advantageous aspect of embodiments of the disclosures made herein is that processing power of a network element is not adversely affected. Specifically, synchronization and redundancy in accordance with embodiments of the disclosures made herein are facilitated in an efficient and effective manner. Accordingly, a significant majority of processing power of the network element is available for performing primary tasks of the network element (e.g., switching, routing, etc).

Still another advantageous aspect of embodiments of the disclosures made herein is that such embodiments are less costly to implement and maintain than conventional solutions. Such embodiments do not require redundant network elements, but rather redundant routing modules within a particular network element. In some embodiments, the redundant routing modules are implemented identically, thus reducing cost. For example, similar software may be executed within each of the redundant routing modules. In other embodiments, differently-implemented redundant routing modules may be used.

It should be understood that embodiments of the present invention may be practiced with a variety of higher layer protocols. While BGP packets are mentioned in many places herein, it should be understood that routes can also arrive from other protocols (e.g., Open Shortest Path First (OSPF)), or due to configuration changes (e.g., static routes). Not only are routes kept is sync between an active routing module and an inactive routing module, but so is configuration. The configuration can also change on-the-fly (e.g., a BGP peer may be added or removed at any time). It should be noted that a higher layer protocol may be used for advertising routes, but may also be used for withdrawing routes (e.g., a BGP packet may also specify a route to withdraw).

Turning now to the figures, a method 100 for synchronizing TCP tasks running on redundant routing modules of a network element in accordance with an embodiment of the disclosures made herein is depicted in FIG. 1. The method is performed by a network element preferably comprising a line card 134, an active routing module 136, and an inactive routing module 138. Various steps of the method are illustrated as being performed by the line card 134, by the active routing module 136, and by the inactive routing module 138. The method 100 begins at an operation 102 where a line card of a network element forwards a Protocol Data Unit (PDU), or a copy thereof, for reception by an active routing module and an inactive routing module of the network element. An Internet Protocol routing module is an example of both the active and the inactive routing modules. An apparatus capable of providing routing functionality (i.e., a router) is an example of the network element. In other embodiments, the network element need not be implemented on a router, but may by implemented on one or more other network devices. As an example, for embodiments wherein the higher layer protocol packets are Multi-Protocol Label Switching (MPLS) packets, the network element may be so implemented. Accordingly, the active routing module and inactive routing module may be considered more generically to be simply an active module and an inactive module. The active routing module performs an operation 104 for receiving the PDU while the inactive routing module effectively ignores (e.g., receives but not process) the PDU in operation 140.

After receiving the PDU, the active routing module performs an operation 106 for extracting a TCP packet encapsulated within the PDU. The TCP packet extracted from the PDU is hereinafter referred to as the inbound TCP packet. The active routing module TCP task performs an operation 110 for receiving the first copy of the inbound TCP packet.

After the active routing module receives the first copy of the inbound TCP packet, the active routing module TCP task performs an operation 114 for storing the first copy of the inbound TCP packet in a receive queue associated with the active routing module TCP task. After operation 114, the active routing module performs operation 142 to make a determination as to whether or not the inbound TCP packet should be forwarded to the inactive routing module 138. If it is determined that the inbound TCP packet should not be forwarded, the process continues to operation 144, where the inbound TCP packet is not forwarded. If it is determined that the inbound TCP packet should be forwarded, the process continues to operations 108 and 120. In operation 108, the active routing module forwards a first copy of the inbound TCP packet for reception by a TCP task of the active routing module (i.e., the active routing module TCP task) and a second copy of the inbound TCP packet for reception by a TCP task of the inactive routing module (i.e., the inactive routing module TCP task). In at least one embodiment, operation 114 is performed before operation 108, while, in at least one embodiment, operation 108 is performed before operation 114. It is important to note that the active routing module processes the incoming TCP packet and then, if appropriate, forwards the incoming TCP packet (along with other information) to the inactive routing module. Some incoming TCP packets, for example, acknowledgements that contain no data, need not be forwarded to the inactive routing module. The inactive routing module TCP task performs an operation 112 for receiving the second copy of the inbound TCP packet. Similarly, after the inactive routing module receives the second copy of the inbound TCP packet, the inactive routing module TCP task performs an operation 116 for storing the second copy of the inbound TCP packet in a receive queue associated with the inactive routing module TCP task. The operation 116 for storing the second copy of the inbound TCP packet in a receive queue associated with the inactive routing module TCP task includes initially storing second copy of the inbound TCP packet in a pending portion of the receive queue associated with the inactive routing module TCP task (i.e., the pending portion of the inactive routing module receive queue).

In operation 120, a BGP task of the active routing module (i.e., the active routing module BGP task) facilitates recordation of the peer network element from which the inbound TCP packet was received. As discussed below in greater detail in reference to FIG. 2, such a record of the peer network element from which the inbound TCP packet was received is used for facilitating an activity switch from the active routing module to the inactive routing module if a failure occurs while processing the BGP packet. After operation 120, the active routing module BGP task performs an operation 118 for processing the BGP message.

After operation 118, an operation 121 is performed for determining whether processing of the BGP message contained in the first copy of the inbound TCP packet is performed successfully. When the operation 118 for processing a BGP message contained in the first copy of the inbound TCP packet is successfully performed, the inactive routing module TCP task performs an operation 122 for storing the second copy of the inbound TCP packet in a ready portion of the receive queue associated with the inactive routing module TCP task (i.e., the ready portion of the inactive module receive queue). In at least one embodiment of the operation 122, the operation 122 for storing the second copy of the inbound TCP packet in the ready portion of the inactive routing module receive queue includes forwarding the second copy of the inbound TCP packet from the pending portion to the ready portion of the inactive routing module receive queue. Upon a determination in operation 121 that processing of the BGP message contained in the first copy of the inbound TCP packet was performed successfully, the second copy of the inbound TCP packet can be immediately moved from the pending portion to the ready portion of the inactive routing module receive queue, but, in at least one embodiment, it is advantageous to cause such action to occur at a later time for performance reasons. For example, an instruction for the inactive routing module to perform operation 122 may be included within other information destined for the inactive routing module to avoid the need to send the instruction separately and to minimize the amount of information being sent to the inactive routing module and the amount of processing required by the inactive routing module.

After, and only after, the second copy of the inbound TCP packet is stored in the ready portion of the inactive routing module receive queue, the inactive routing module BGP task performs an operation 124 for processing the BGP message contained in the second copy of the inbound TCP packet. The active routing module performs an operation 126 for issuing an acknowledgement message for designating that the inbound TCP packet has been received. In at least one embodiment, operation 126 is performed after operation 122, while in at least one other embodiment, operation 126 is performed before operation 122, as long as it is performed after operation 116. The operation for initially storing the second copy of the inbound TCP packet in the pending portion of the inactive routing module receive queue and then in the ready portion of the inactive routing module receive queue enables the second copy of the inbound TCP packet to remain unprocessed by the inactive routing module BGP task until the contents of the inbound TCP packet is determined to be non-offensive (e.g., not causing a BGP task failure) via the active routing module BGP task successfully processing the first copy of the inbound TCP packet. In this manner, the inactive routing module BGP task processes a particular BGP messages after the active routing module BGP task processes the particular BGP message.

In at least one embodiment of the active routing module and inactive routing module BGP tasks, such BGP tasks are precluded from receiving partial TCP packets from the TCP task. Such partial packets may contain partial BGP messages therein, potentially causing synchronization problems when an activity switch is implemented. It is contemplated herein that a TCP task may be configured such it precludes an associated BGP task from recognizing that information of a packet is being received until the information comprises a fill packet. A socket option exists for enabling such functionality.

By enabling the BGP message contained in the second copy of the inbound TCP packet to be processed only after second copy of the TCP packet is stored in the ready portion of the inactive routing module receive queue, it is assured that such processing of the BGP message contained in the second copy of the TCP packet will take place only after the BGP message contained in the first copy of the TCP packet is successfully processed by the active routing module BGP task. It should be understood that the BGP messages contained in the first copy and the second copy of the inbound TCP packet are essentially identical (i.e., the same BGP message). Accordingly, the potential for failure of the active and inactive routing module BGP tasks resulting from the same BGP message is substantially reduced, if not eliminated.

Issuing the acknowledgement message for designating that the inbound TCP packet has been received (e.g., operation 126) only after the second copy of the TCP packet has been stored in the inactive routing module receive queue pending portion (e.g., operation 116) assures that the inactive routing module will not fail to receive any TCP packets, even in the event of an activity switch. Thus, in the event that an activity switch does not occur, the BGP message contained in the first copy of the TCP packet is successfully processed by the active routing module BGP task. Moreover, upon an activity switch, the TCP communication with the peer network element that transmitted a TCP packet including an offending BGP message is terminated. This operational sequence ensures that a TCP packet including an offending BGP message is not processed after such message results in failure of the active routing module BGP task. Thus, redundancy robustness is enhanced.

Turning now to update messages being transmitted from the network element for reception by its peer network elements, it will be appreciated that redundancy can also be provided where such outbound update messages are concerned. For example, in response to receiving a BGP message designating a new route, a route update message is transmitted from the network element for reception by one or more of its peer network elements for notifying such peer network elements of the new route.

Accordingly, in response to the active routing module receiving such types of BGP messages that necessitate an outbound update message or receiving a route from another protocol (e.g., OSPF or ISIS), or in response to an internal event (e.g., a configuration change, such as, for example, adding a static route) for which an update message should be generated, an operation 128, FIG. 1, is performed for storing a first copy of an outbound BGP packet encapsulated within one or more TCP packets in a transmit queue of the active routing module (i.e., the active routing module transmit queue). Operation 128 occurs after operation 118. Also, in response to the active routing module receiving such types of BGP messages that involve an outbound update message, an operation 130 is performed for storing a second copy of the outbound BGP packet encapsulated within one or more TCP packets in a transmit queue of the inactive routing module (i.e., the inactive routing module transmit queue). Similar to receive queue functionality as disclosed herein, in at least one embodiment of the active routing module and inactive routing module transmit queues, such transmit queues are precluded from storing partial BGP packets. An operation 132 is performed for forwarding the first copy of the outbound BGP packet encapsulated within one or more TCP packets from the active routing module transmit queue for reception by one or more peer network elements only after the second copy of the outbound BGP packet encapsulated within one or more TCP packets is stored in the inactive routing module transmit queue. In this manner, retransmission and packet sequencing functionality are maintained after an activity switch from the active routing module to the inactive routing module.

Referring back to the operation 121, this operation is also capable of determining whether processing of the BGP message contained in the first copy of the inbound TCP packet is not successfully performed. In response to the BGP message contained in the first copy of the inbound TCP packet being not being processed successfully by the active routing module BGP task, an activity switch is facilitated, and the process is directed to an entry point "A." The activity switch transfers on-line operations of the network element from the previously active routing module (now the inactive routing module) to a newly active routing module (previously the inactive routing module).

Figure 2:
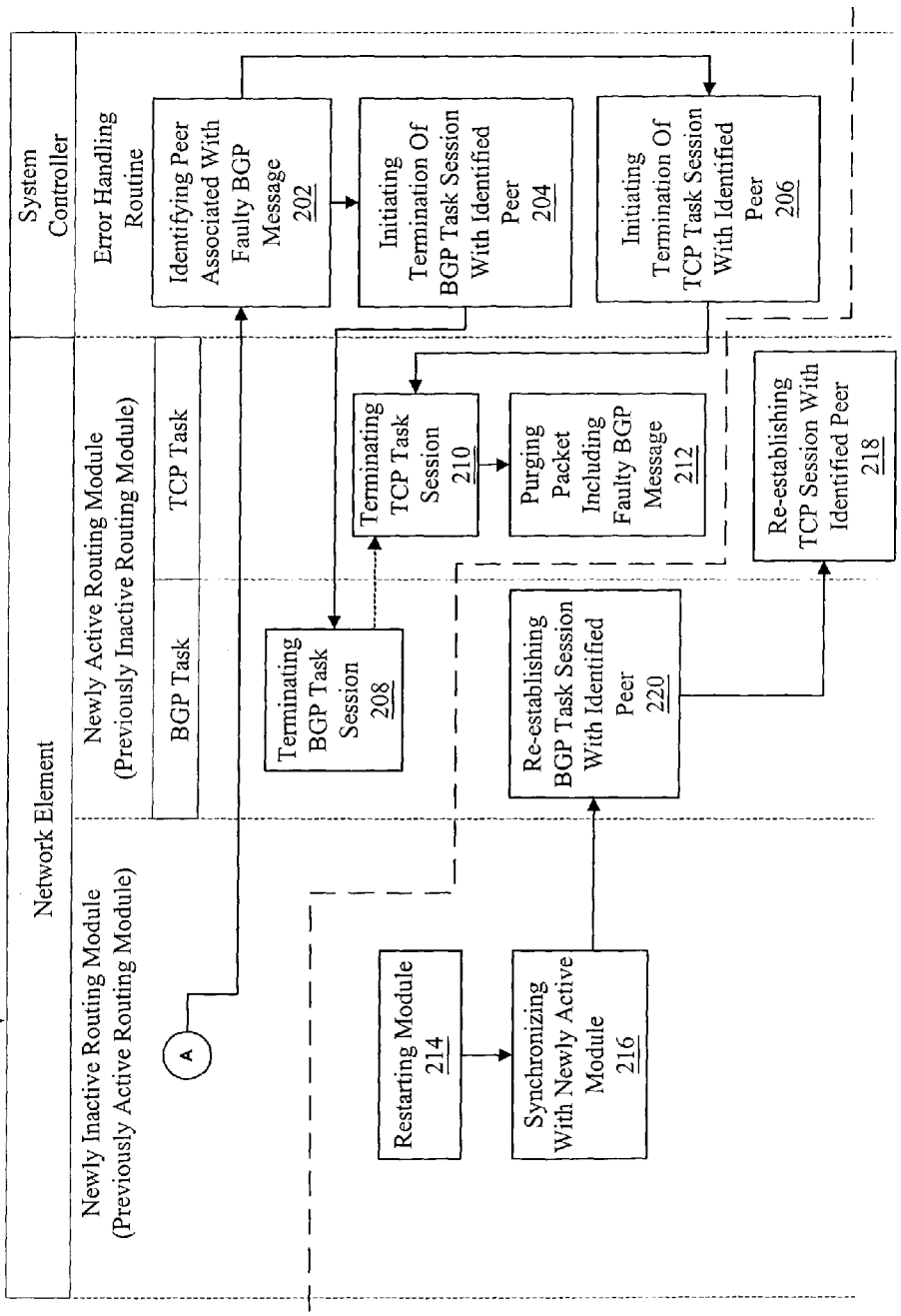
FIG. 2 is a flow chart view depicting a method for facilitating an activity switch in accordance with an embodiment of the disclosures made herein.

FIG. 2 depicts a method 200 for facilitating an activity switch in accordance with an embodiment of the disclosures made herein. The method 200 pertains to an activity switch resulting from an offending inbound TCP packet. A TCP packet including an offending BGP message is one example of the offending TCP packet.

At an entry point "A" corresponding to processing of an errant BGP packet of an inbound TCP packet (i.e., one for which satisfactory error handling has not otherwise been provided), the method 200 begins with an error handling routine invoked by a system controller implements an operation 202 for identifying a peer network element from which the offending inbound BGP packet was received. One embodiment of identifying the identified peer network element includes reading/accessing a record generated in response to the operation 120, FIG. 1, for facilitating recordation of the peer network from which the offending inbound TCP packet was received. It should be noted that, in at least one embodiment, when recording the network element from which a packet has been received, the peer network element of the BGP packet is recorded, not that of the TCP segment. It is possible that the BGP peer network element and TCP peer network element may be different. BGP may have a session with a neighbor that requires multiple TCP hops to reach. As such, the identified peer network element is identified with respect to the higher layer protocol packet (e.g., the BGP packet).

The system controller may, for example, be a control element, such as a processor, coupled to the network element or incorporated within the network element. For example, the system controller may be implemented as a process that reads the record to determine the peer network element from which the packet was received and to initiate the termination of the associated BGP session on the inactive routing module. In at least one embodiment, this process is contained within the active routing module. When required to terminate a session, the active routing module (e.g., the system controller contained within the active routing module) communicates with the inactive routing module as to which peering session to terminate.

After identifying the peer network element from which the offending inbound BGP packet was received (i.e., the identified peer network element), the error handling routing performs an operation 204 for initiating termination of a BGP session associated with the identified peer network element and an operation 206 for initiating termination of a TCP session associated with the identified peer network element. Since, in at least one embodiment, initiating termination of a BGP session will inherently initiate termination of a TCP session, operations 204 and 206 may optionally be performed as a single operation. Likewise, such a single operation may result in performance of operation 208, which may inherently result in performance of operation 210. After initiating termination of the BGP and TCP sessions associated with the identified peer network element, the newly active routing module TCP task performs an operation 210 for terminating the TCP session associated with the identified peer network element, and the soon-to-be-newly active routing module BGP performs an operation 208 for terminating the BGP session associated with the identified peer network element. In response to facilitating termination of the TCP session associated with the identified peer network element, the newly active routing module TCP task performs an operation 212 for purging the offending inbound TCP packet from the receive queue of the newly active routing module. The actual switching of functional operations is facilitated after the TCP and BGP sessions are terminated and the offending inbound TCP packet is purged from the receive queue of the newly active routing module. Because the TCP session has been terminated, even if the offending inbound TCP packet has not been acknowledged, it will not be re-sent, thereby avoiding a failure of the newly active routing module.

As an additional precaution, TCP and BGP task sessions with the identified peer network element are re-established after an operation 214 is performed for restarting the newly inactive module and until after an operation 216 is performed for synchronizing existing routing-related information of the newly inactive routing module with the newly active routing module. Such routing-related information may include information stored in a routing information database, as well as other information, such as configuration information (e.g., static configuration information) and state information (e.g., dynamic state information). In response to synchronizing such existing routing-related information, the newly active routing module BGP task performs an operation 220 for re-establishing a BGP session with the identified peer network element. To re-establish a BGP session in accordance with operation 220, the newly active routing module TCP task performs an operation 218 for re-establishing a TCP session with the identified peer network element. In this manner, risk associated with re-establishing such task sessions with the identified network element without a redundant routing module being in place are reduced, if not eliminated. Optionally, in at least one embodiment, BGP and TCP task sessions are maintained with other peer network elements besides the identified peer network element.

Figure 3:
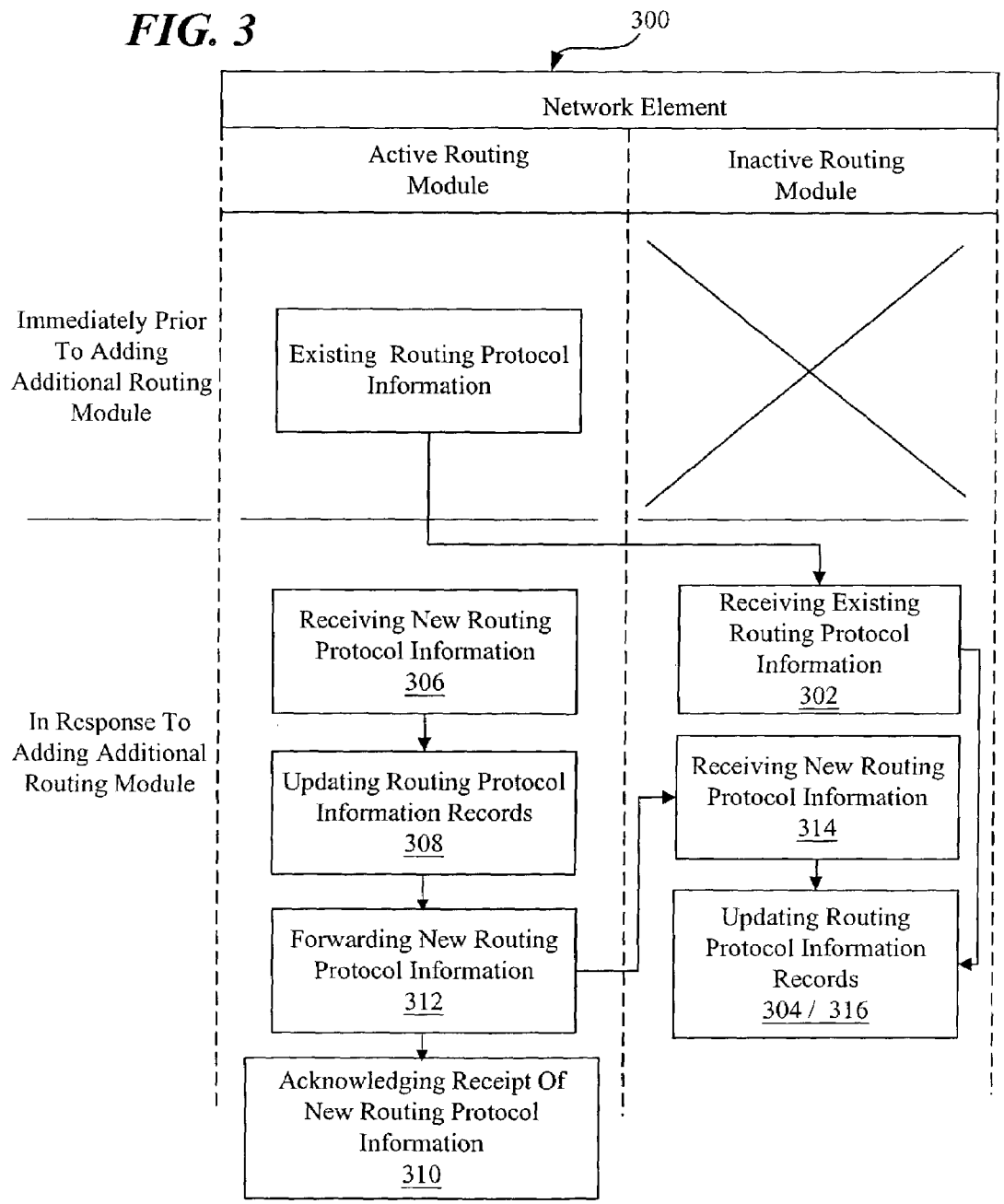
FIG. 3 is a flow chart view depicting a method for synchronizing routing protocol information associated with a plurality of routing modules of a network element in accordance with an embodiment of the disclosures herein.

FIG. 3 depicts a method 300 for synchronizing routing protocol information associated with a plurality of routing modules of a network element in accordance with an embodiment of the disclosures herein. By synchronizing such routing protocol information, redundancy in accordance with the disclosures made herein may be implemented. Such synchronization contributes to enabling an activity switch from a first routing module of the network element to a second routing module of the network element in an essentially transparent manner with respect to peer network elements.

The method 300 begins with an inactive routing module performing an operation 302 for receiving a copy of existing routing protocol information from an active routing module. The operation 302 is performed in response to the inactive routing module being an additional routing module that is added to a network element including the active routing module. Because the active routing module is an existing, in-use routing module of the network element, the active routing module has such existing routing protocol information associated therewith prior to addition of the inactive routing module. For example, it may be the case that at least a portion of the routing protocol information was dynamically established in the existing routing module over a period of time prior to the addition of the additional routing module to the network element. Examples of routing protocol information include TCP related state information, BGP configuration, BGP routing tables, and route state information (e.g., designation that a route has been advertised to peer network elements).

In response to the inactive routing module receiving such existing routing information, an operation 304 is performed for updating inactive routing module records associated with such routing protocol information. An embodiment for updating such inactive routing module records associated with such existing routing protocol information includes updating a routing information database of the inactive routing module. In one embodiment of the inactive routing module, the inactive routing module does not include any existing routing protocol information (e.g., the inactive routing module is a new routing module being put into service). In another embodiment of the inactive routing module, the inactive routing module includes existing routing protocol information that is being updated.

At some point in time after the inactive routing module is added to the network element and during the normal course of operation of the active routing module, the active routing module performs an operation 306 for receiving a first copy of new routing protocol information (newly-received routing protocol information) from one or more peer network elements. In response to receiving such newly-received routing protocol information, the active routing module performs an operation 308 for updating active routing module records associated with such newly-received routing protocol information, an operation 312 for forwarding a second copy of such newly-received routing protocol information for reception by the inactive routing module, and an operation 310 for acknowledging receipt of such newly received routing protocol information. Thus, acknowledgement is provided to the one or more peer network elements from which the new routing protocol information was received after a copy of such new routing protocol information (or the portion thereof for which the acknowledgement is being provided) has been forwarded to the inactive routing module (i.e., the additional routing module). After the active routing module forwards such newly-received routing protocol information for reception by the inactive routing module, the inactive routing protocol performs an operation 314 for receiving such newly-received routing protocol information and an operation 316 for updating inactive routing module records associated with such routing protocol information. It should be noted that operations 304 and 316 may be performed as separate operations or combined into a single operation. A TCP packet including a BGP message is an example of such newly-received routing protocol information during the normal course of operation of the active routing module.

Figure 4:
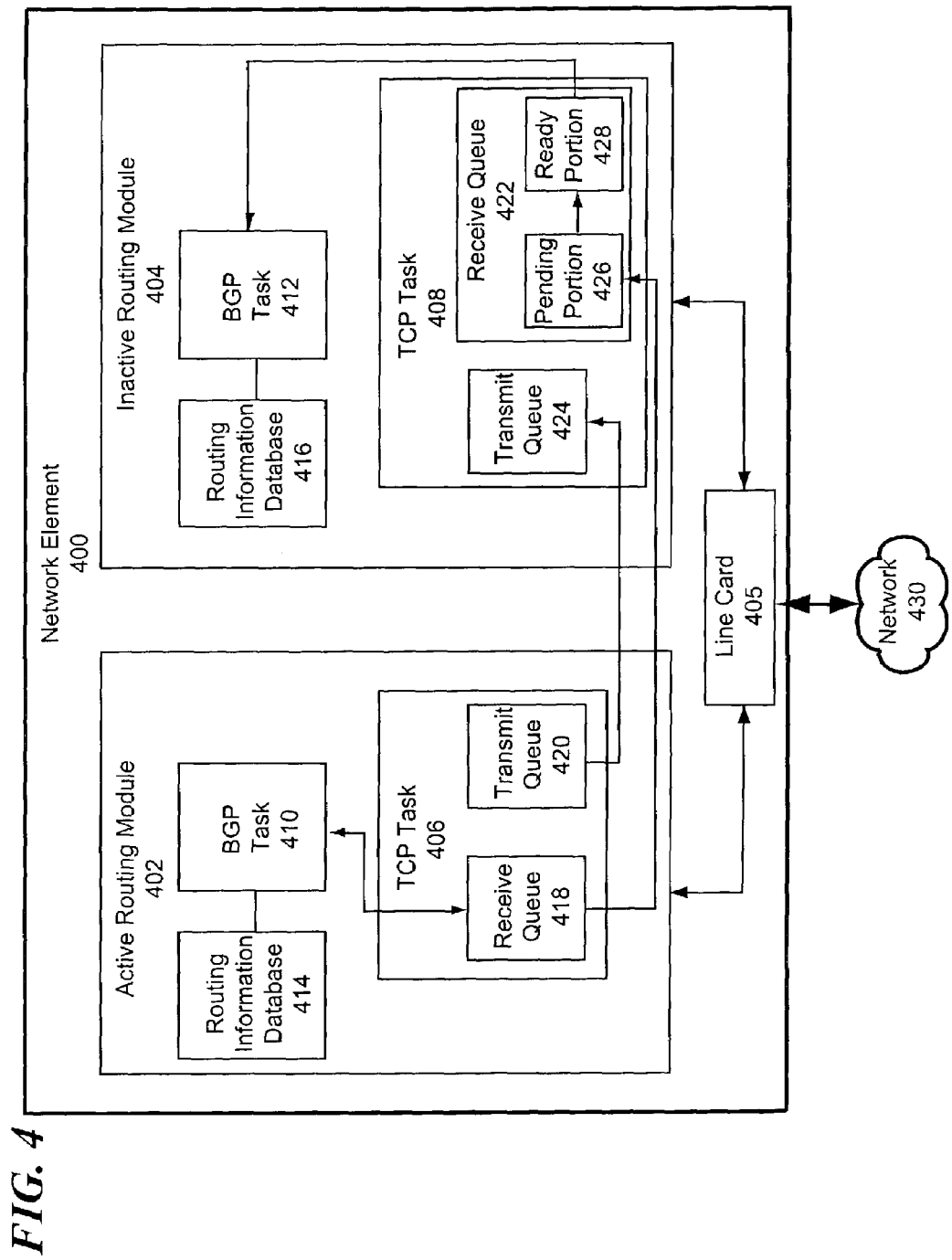
FIG. 4 is a block diagram view depicting a network element 400 capable of carrying out methods in accordance with embodiments of the disclosures made herein.

Referring now to FIG. 4, a network element 400 capable of carrying out methods in accordance with embodiments of the disclosures made herein is depicted. Specifically, the network element 400 is capable of carrying out redundancy and synchronization functionality in accordance with the disclosures made herein. For example, the network element 400 is capable of carrying out the methods disclosed herein (e.g., the methods 100, 200 and 300). An apparatus capable of providing routing functionality (e.g., a router) is an example of the network element 400.

The network element 400 includes an active routing module 402 (i.e., the first routing module), an inactive routing module 404 (i.e., the second routing module), and a line card 405 connected between the active and inactive routing modules (402, 404). The line card facilitates routing a respective copy of each inbound TCP packet (e.g., via forwarding of corresponding Protocol Data Units (PDUs)). However, the TCP task of the inactive routing module 402 ignores such TCP packets (e.g., does not process the PDUs) while the TCP task of the active routing module 402 processes such TCP packets.

The active routing module 402 and the inactive routing module 404 are capable of facilitating redundant functionality in according with the disclosures made herein. The active routing module 402 and the inactive routing module 404 each include respective TCP tasks (406, 408), respective BGP tasks (410,412) and respective routing information databases (414,416). The TCP tasks (406,408) are each examples of lower layer protocol tasks. The BGP tasks (410,412) are each examples of higher layer protocol tasks. It is contemplated herein that BGP tasks (410,412) maybe substituted with other protocols that use TCP to exchange messages (e.g., multi-protocol label switching (MPLS)).

The TCP task 406 of the active routing module includes a receive queue 418 and a transmit queue 420. The TCP task 408 of the inactive routing module 404 includes a receive queue 422 and a transmit queue 424. The receive queue 422 includes a pending portion 426 and a ready portion 428. The pending portion 426 and the ready portion 428 of the inactive routing module receive queue 422 facilitate functionality as depicted in FIG. 1. Specifically, the pending portion 426 and the ready portion 428 of the inactive routing module receive queue 422 enables a particular copy of a TCP packet to remain unprocessed by the inactive routing module BGP task 412 until the contents of such TCP packet is determined to be non-offensive (e.g., not causing a BGP task failure) by the BGP task 410 of the active routing module 402. This, the inactive routing module BGP task 412 processes a particular BGP message after the active routing module BGP task 410 processes the particular BGP message.

In some embodiments of the inactive routing module, the inactive routing module 404 does not receive flow control updates from the active routing module 402. Thus, it is theoretically possible for the inactive routing module receive queue 422 to overflow. To reduce this possibility, the inactive routing module receive queue 422 is preferably much larger than the active routing module receive queue 418 in such embodiments. However, it should be understood that the inactive routing module 404 does less work than the active routing module 402 (e.g., the flooding responsibilities are greatly reduced, the TCP/IP stack is not transmitting data, etc.). Accordingly, there should not be a steady state possibility where the inactive routing module receive queue 422 continues to grow without limit.

It should be understood that the active routing module 402 is capable of supporting functionality disclosed herein in association with the inactive routing module 404 and the inactive routing module 404 is capable of supporting functionality disclosed herein in association with the active routing module 402. Accordingly, in the event of an activity switch in accordance with the disclosures made herein, the active routing module 402 (i.e., the newly inactive routing module) provides functionality previously provided by the inactive routing module 404 (i.e., the newly active routing module) and the inactive routing module 404 provides functionality previously provided by the active routing module 402. For example, after an activity switch, the active routing module 402 provides functionality associated with the pending queue 426 and ready queue 428 of the inactive routing module 404.

In accordance with at least one embodiment of the disclosures made herein, the BGP tasks of the active routing module 402 and the inactive routing module 404 do not queue any transmit data on a per-peer (i.e., per socket) basis. One reason that the BGP tasks no longer queue on a per-peer basis is because data queued in the BGP task would not be guaranteed of delivery after an activity switch. Another reason is that synchronization of lists of routes which need to be advertised or withdrawn would be excessively intensive if BGP task transmit queues needed searching.

It is contemplated herein that the active routing module transmit queue 420 is enlarged in order to enable omission of a transmit queue of the active routing module BGP task. That is, the transmit queue 420 of the active routing module TCP task 406 needs to be large enough to ensure that transmissions continue between successive periods of processing of advertised or withdrawn routes.

Because the BGP tasks (410,412) of the active and inactive routing modules (402, 404) cannot queue any transmit data, an operation for transmitting data to the active routing module TCP task 406 must succeed. Otherwise, the active routing module BGP task 410 would have to queue such transmit data, which it preferably does not do. To ensure that the operation for transmitting data to the active routing module TCP task 406 succeeds, the active routing module BGP task 410 first ensures that sufficient space exists in the transmit queue 420 associated with the active routing module TCP task 406. In one embodiment, ensuring that such sufficient space exists is accomplished via a read in shared memory. To this end, the TCP task 406 of the active routing module 402 maintains a table of free space in the active routing module transmit queue 420. However, in other embodiments, other techniques may be used for ensuring that such sufficient space exists.

Referring now to data processor programs in accordance with an embodiment of the disclosures made herein, a data processor program controls at least a portion of the operations associated with synchronizing higher layer protocol tasks (e.g., BGP) and lower layer protocol tasks (e.g., TCP) running on redundant routing modules of a network element. In this manner, the data processor program controls at least a portion of the operations necessary to facilitate routing module synchronization functionality in a manner consistent with the disclosures made herein. The term data processor program is defined herein to refer to computer software, data processor algorithms or any other type of instruction code capable of controlling operations associated with a data processor. A microprocessor, microcontroller, microcomputer, digital signal processor, state machine, logic circuitry, and/or any device that manipulates digital information based on operational instruction, or in a predefined manner are examples of a data processor.

A data processor program in accordance with an embodiment of the disclosures made herein is processible by a data processor of an active and/or inactive routing module of a network element. A copy of the data processor program may be resident on each of the routing elements in a network element. Furthermore, each copy of the data processor program may be accessible by a data processor of the respective routing module from a memory apparatus of the respective routing module (e.g., RAM, ROM, virtual memory, hard drive memory, etc.) or from a peripheral apparatus such as a diskette, a compact disk, an external data storage device and the like.

A data processor program accessible from an apparatus by a data processor is defined herein as a data processor program product. It is contemplated herein that the data processor program product may comprise more than one data processor programs each accessible from respective apparatuses. It is further contemplated herein that each one of a plurality of data processor programs may be accessed by a different respective one of a plurality of data processors. For example, a first data processor and a second data processor (e.g., of a leaf node and a root node), respectively, may access a first data processor program and a second data processor program, respectively, from a first apparatus and a second apparatus (e.g., a first memory device and a second memory device), respectively.

In the preceding detailed description, reference has been made to the accompanying drawings that form a part hereof, and in which are shown by way of illustration specific embodiments in which the invention may be practiced. These embodiments have been described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description omits certain information known to those of skill in the art. The preceding detailed description is, therefore, not to be taken in a limiting sense, and the scope of the present invention is defined only by the appended claims.

What is claimed is:

1. A method for providing redundant protocol processes in a network element, comprising:

receiving at least one lower layer protocol packet at a lower layer task of a first module, wherein the at least one lower layer protocol packet includes a higher layer protocol packet encapsulated therein;

determining a peer network element from which the higher layer protocol packet was received in response to failure of a higher layer protocol task of the first module while processing the higher layer protocol packet;

terminating higher layer and lower layer protocol sessions of a second module with the peer network element from which the higher layer protocol packet was received in response to determining the peer network element from which the higher layer protocol packet was received; and implementing an activity switch from the first module to the second module after terminating the higher layer and the lower layer protocol sessions with the peer network element from which the higher layer protocol packet was received.

2. The method of claim 1 wherein:

the at least one lower layer protocol packet is a Transmission Control Protocol (TCP) packet; and the higher layer protocol packet is a Border Gateway Protocol (BGP) packet.

3. The method of claim 1 wherein:

the at least one lower layer protocol packet is a Transmission Control Protocol (TCP) packet; and the higher layer protocol packet is a Multi-Protocol Label Switching (MPLS) packet.

4. The method of claim 1 wherein determining the peer network element from which the higher layer protocol packet was received includes accessing a record of the peer network element maintained by the higher layer protocol task of the first module.

5. The method of claim 4 further comprising:

communicating with the second module the higher layer and lower layer protocol sessions to be terminated.

6. The method of claim 1 wherein the higher layer and the lower layer protocol sessions are a Border Gateway Protocol (BGP) task session and a Transmission Control Protocol (TCP) task session, respectively.

7. The method of claim 1 wherein terminating the lower layer protocol session includes removing a copy of the at least one lower layer protocol packet from a receive queue of the second module.

8. The method of claim 1, further comprising:
synchronizing the first module with the second module after terminating the higher layer and the lower layer protocol sessions of the second module with the peer network element from which the higher layer protocol packet was received; and
implementing higher layer and lower layer protocol sessions between the second module and the peer network element from which the higher layer protocol packet was received after synchronizing the first module with the second module.

9. The method of claim 8 wherein synchronizing the first module with the second module includes synchronizing at least a portion of information in a routing information database of the first module with corresponding information in a routing information database of the second module.

10. The method of claim 9 wherein the synchronizing the first module with the second module further includes synchronizing at least a portion of configuration information and state information of the first module with corresponding configuration information and corresponding state information of the second module.

11. The method of claim 1 further comprising:
receiving other lower layer protocol packets at the lower layer task of the first module, wherein the other lower layer protocol packets include other higher layer protocol packets encapsulated therein; and
processing the other higher layer protocol packets in the second module after processing the other higher layer protocol packets in the first module.

12. The method of claim 11 wherein the step of processing the other higher layer protocol packets further comprises:
processing the other higher layer protocol packets in the second module sufficiently after processing the other higher layer protocol packets in the first module so as to provide an ability to prevent the second module from processing at least one of the other higher layer protocol packets when the at least one of the other higher layer protocol packets results in failure of the higher layer protocol task of the first module.

13. Apparatus for providing redundant protocol processes in a network element, comprising:
a first module for receiving at least one lower layer protocol packet at a lower layer task, wherein the at least one lower layer protocol packet includes a higher layer protocol packet encapsulated therein, and for determining a peer network element from which the higher layer protocol packet was received in response to failure of a higher layer protocol task of the first module while processing the higher layer protocol packet;
a second module coupled to the first module; and
a system controller coupled to the first module and the second module, the system controller for initiating termination of higher layer and lower layer protocol sessions of the second module with the peer network element from which the higher layer protocol packet was received in response to the determining the peer network element from which the higher layer protocol packet was received and for implementing an activity switch from the first module to the second module after the initiating termination of the higher layer and the lower layer protocol sessions with the peer network element from which the higher layer protocol packet was received.

14. The apparatus of claim 13 wherein:
the at least one lower layer protocol packet is a Transmission Control Protocol (TCP) packet; and
the higher layer protocol packet is a Border Gateway Protocol (BGP) packet.

15. The apparatus of claim 13 wherein:
the at least one lower layer protocol packet is a Transmission Control Protocol (TCP) packet; and
the higher layer protocol packet is a Multi-Protocol Label Switching (MPLS) packet.

16. The apparatus of claim 13 wherein the system controller accesses a record of the peer network element maintained by the higher layer protocol task of the first module.

17. The apparatus of claim 16 wherein the system controller communicates with the second module to determine the higher layer and lower layer protocol sessions to be terminated.

18. The apparatus of claim 13 wherein the higher layer and the lower layer protocol sessions are a Border Gateway Protocol (BGP) task session and a Transmission Control Protocol (TCP) task session, respectively.

19. The apparatus of claim 13 wherein the system controller causes a copy of the at least one lower layer protocol packet to be removed from a receive queue of the second module.

20. The apparatus of claim 13 wherein the first module synchronizes with the second module after the termination of the higher layer and the lower layer protocol sessions of the first module with the peer network element from which the higher layer protocol packet was received, and wherein the second module implements higher layer and lower layer protocol sessions with the peer network element from which the higher layer protocol packet was received after synchronization of the first module with the second module.

21. The apparatus of claim 20 wherein the synchronization of the first module with the second module includes synchronizing at least a portion of information in a routing information database of the first module with corresponding information in a routing information database of the second module.

22. The apparatus of claim 21 wherein the synchronization of the first module with the second module further includes synchronizing at least a portion of configuration information and state information of the first module with corresponding configuration information and corresponding state information of the second module.

23. The apparatus of claim 13 wherein the first module further receives other lower layer protocol packets at the lower layer task, wherein the other lower layer protocol packets include other higher layer protocol packets encapsulated therein, wherein the second module is adapted to process the other higher layer protocol packets after the first module processes the other higher layer protocol packets.

24. The apparatus of claim 23 wherein the second module is adapted to process the other higher layer protocol packets sufficiently after the first module processes the other higher layer protocol packets so as to provide an ability to prevent the second module from processing at least one of the other higher layer protocol packets when the at least one of the other higher layer protocol packets results in failure of the higher layer protocol task of the first module.

25. The apparatus of claim 13 wherein the system controller is implemented within the first module, and a corresponding system controller is implemented within the second module, wherein functionality of the system controller is provided by the corresponding system controller upon the activity switch.

* * * * *